T. LARSON.
GRAIN DRILL.
APPLICATION FILED MAY 21, 1917.
1,306,823.
Patented June 17, 1919.
2 SHEETS—SHEET 1.
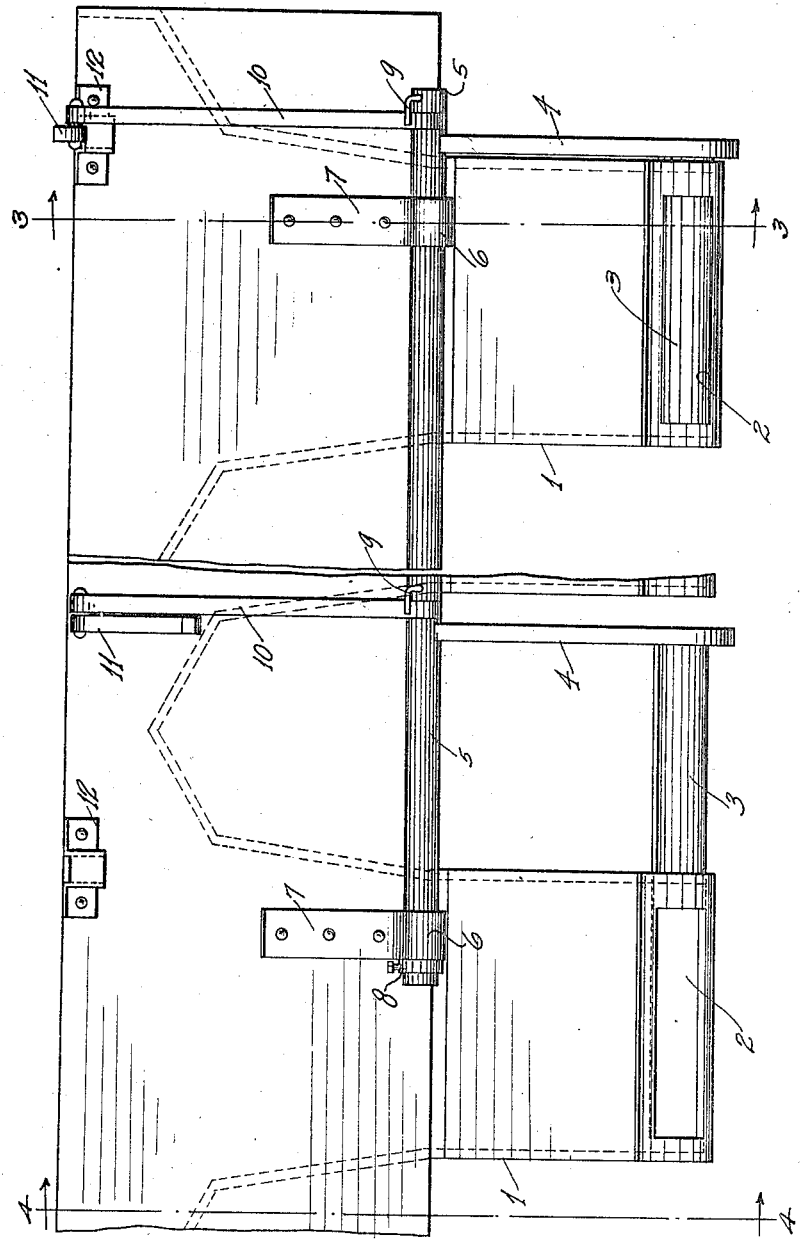
WITNESSES
Emil Hallenberg.
E. D. Jaeker
INVENTOR
T. Larson
By H. J. Sanders
Atty

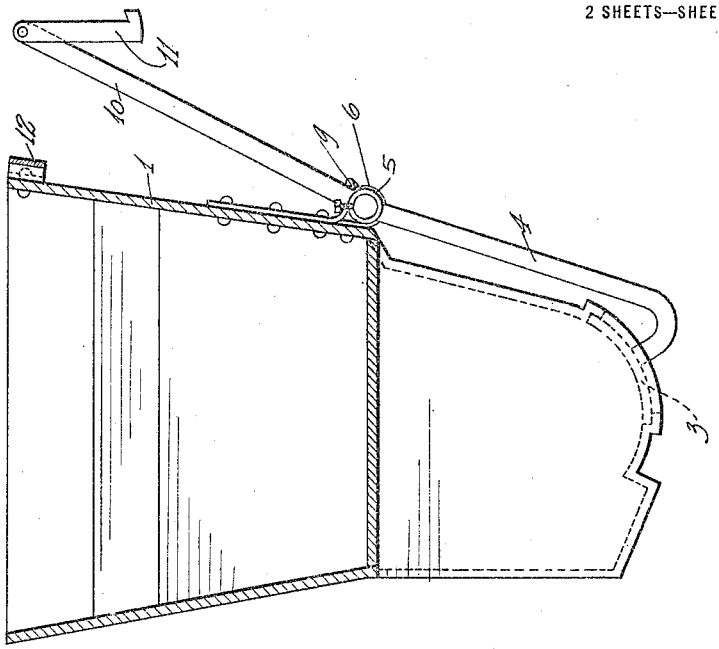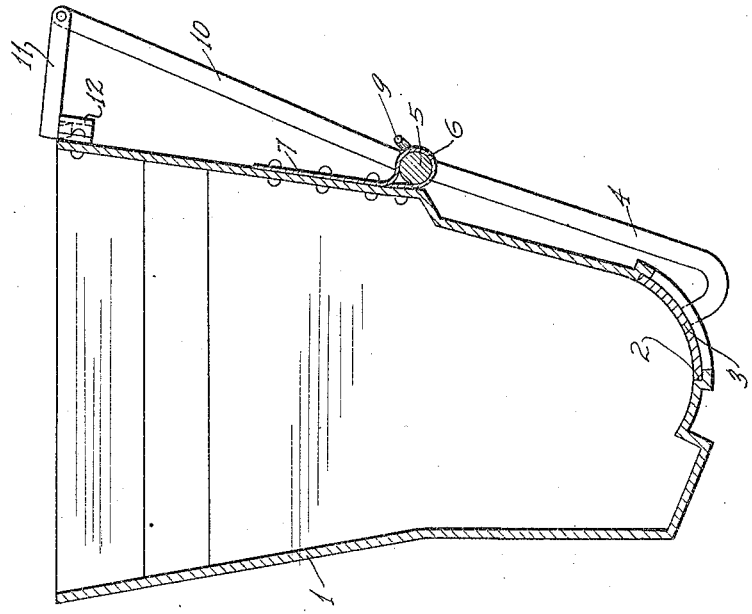

UNITED STATES PATENT OFFICE.

THORVALD LARSON, OF ARCO, MINNESOTA.

GRAIN-DRILL.

1,306,823.　　　　　Specification of Letters Patent.　　Patented June 17, 1919.

Application filed May 21, 1917. Serial No. 170,034.

*To all whom it may concern:*

Be it known that I, THORVALD LARSON, a citizen of the United States, residing at Arco, in the county of Lincoln and State of Minnesota, have invented certain new and useful Improvements in Grain-Drills, of which the following is a specification.

This invention relates to improvements in grain drills and more particularly to means for effecting a clean discharge of the contents of the drill cups in changing from one kind of grain to another or for other purpose. With the foregoing and other objects in view the invention consists in the combination and arrangement of parts to be hereinafter fully described, pointed out in the appended claims and illustrated in the accompanying drawings which form a part of this specification and in which—

Figure 1 is a rear elevation with the discharge port shown in open position.

Fig. 2 is a similar view in closed position.

Fig. 3 is a section taken on line 3—3 of Fig. 2.

Fig. 4 is a section taken on line 4—4 of Fig. 1.

Like reference characters denote corresponding parts throughout the several views.

The reference numeral 1 denotes the seed or drill box in the bottom of which is formed the discharge opening 2 which is normally closed by the sliding valve or gate 3 which is connected to and operated by the arm 4 fast to the sliding bar 5 carried by the looped end 6 of a strap 7 secured to the rear wall of the said seed box. The said bar 5 is provided with a stop collar 8 which prevents its withdrawal from the said loop 6 in one direction. An angular pin 9 fast to the opposite end of said bar 5 is adapted for engagement with a lever arm 10 which is terminally secured to the said bar 5 whereby said bar 5 may be rotated or moved longitudinally. The said lever arm 10 is pivotally connected to a latch bar 11 the free end of which is normally in engagement with a keeper 12 carried at the upper edge of the rear wall of the feed box. In Fig. 2 the gate 3 has closed the discharge opening 2. To release the grain from the box 1 the latch bar 11 is raised out of the keeper 12 and the lever arm 10, at its upper end, moved away from the strap 7 thus sliding the gate 3 out of register with the said discharge opening 2.

What is claimed is:—

1. In a grain drill, the combination with a seed box having a discharge opening therein, of a gate normally closing said opening, a sliding rod carried by said seed box, connection between said rod and said gate, an angular pin carried at one end of said sliding rod, a lever arm connected to said sliding rod for engagement with said angular pin, a latch bar pivotally connected to said lever arm, and a keeper for said latch bar.

2. In a grain drill, the combination with a seed box having a discharge opening, of a gate normally closing said opening, a terminally looped strap secured to the back of said seed box above said gate, a sliding bar arranged in the looped portion of said strap, an arm connecting said sliding bar and gate, a lever arm operatively connected to said sliding bar, a latch bar pivotally carried by said lever arm and adapted for movement at right angles to the plane of movement of said lever arm, and a keeper carried by said seed box and adapted to receive said latch bar in one position of said lever arm.

In testimony that I claim the foregoing as my own I have hereto affixed my signature in the presence of two subscribing witnesses.

THORVALD LARSON.

Witnesses:
　ED BLEGEN,
　MARCUS BLEGEN.

Copies of this patent may be obtained for five cents each, by addressing the "Commissioner of Patents, Washington, D. C."